United States Patent [19]

Carter

[11] 3,920,767

[45] Nov. 18, 1975

[54] ISOPARAFFIN-OLEFIN ALKYLATION USING HF-ETHYL FLUORIDE CATALYSIS WITH RECOVERY OF ETHYL FLUORINE AND ALKYLATION OF SECONDARY AND TERTIARY ALKYL FLUORIDES

[75] Inventor: Cecil O. Carter, Bartlesville, Okla.

[73] Assignee: Phillips Petroleum Company, Bartlesville, Okla.

[22] Filed: May 29, 1974

[21] Appl. No.: 474,255

[52] U.S. Cl. .................... 260/683.48; 260/683.42
[51] Int. Cl.² ........................................... C07C 3/54
[58] Field of Search...... 260/683.48, 683.42, 683.43

[56] References Cited
UNITED STATES PATENTS

| | | | |
|---|---|---|---|
| 3,594,444 | 7/1971 | Jones............................ | 260/683.48 |
| 3,763,265 | 10/1973 | Hutson, Jr. et al. .......... | 260/683.48 |
| 3,825,616 | 7/1974 | Chapman....................... | 260/683.42 |

Primary Examiner—Delbert E. Gantz
Assistant Examiner—G. J. Crasanakis

[57] ABSTRACT

In an HF alkylation of isoparaffin with olefin using ethyl fluoride in the HF catalyst, the recovery from the reactor effluent, comprising the usual constituents of such an effluent, of ethyl fluoride while alkylating secondary and tertiary fluorides in a fractionation zone by contacting the fractionation effluent with HF liquid to recover into the HF the ethyl fluoride and simulultaneously to alkylate the secondary and tertiary alkyl fluorides, and trapping out the ethyl fluoride enriched HF from which ethyl fluoride can be recovered for reuse in alkylation reaction. In a described embodiment, ethyl fluoride is absorbed into propane stripped, lean HF and the mixture thus obtained passes through at least a portion of the fractionator from which a recycle isoparaffin stream is drawn off and in which the higher fluorides tend to concentrate thus to alkylate the higher fluorides to form additional alkylate which is removed together with the alkylate product from the fractionator.

4 Claims, 1 Drawing Figure

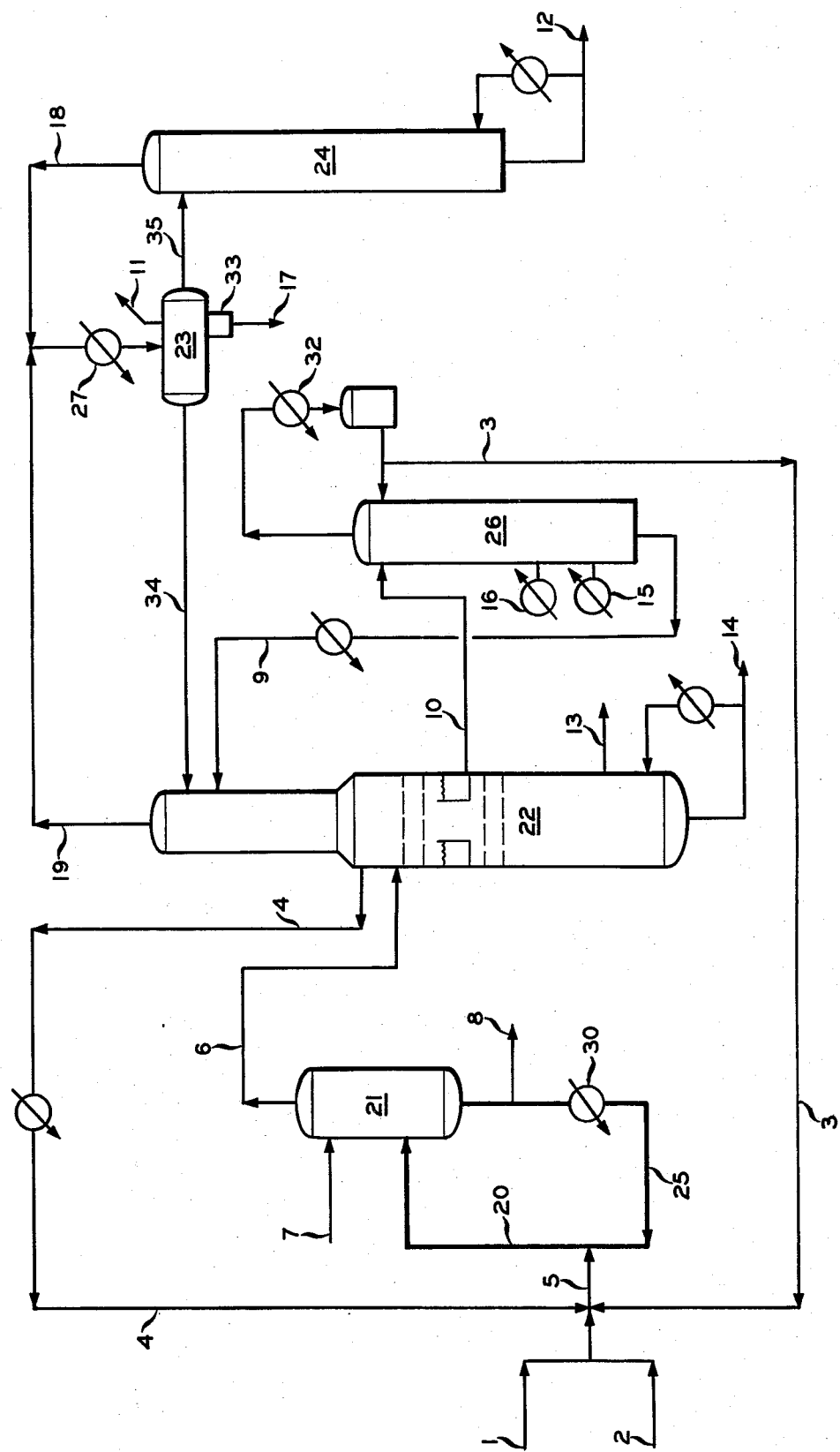

ISOPARAFFIN-OLEFIN ALKYLATION USING HF-ETHYL FLUORIDE CATALYSIS WITH RECOVERY OF ETHYL FLUORINE AND ALKYLATION OF SECONDARY AND TERTIARY ALKYL FLUORIDES

This invention relates to alkylation of an isoparaffin with an olefin. More particularly it relates to the alkylation of an isoparaffin with an ethylene containing olefin stream. Further still, it relates to an alkylation of an isoparaffin and an ethylene containing olefin stream in the presence of hydrogen fluoride and ethyl fluoride.

In one of its concepts, the invention provides a process wherein in a fractionation zone ethyl fluoride is recovered for reuse and the secondary and tertiary organic fluorides are alkylated with isoparaffin to form additional alkylate by passing into said fractionation zone HF liquid and passing said HF liquid through said fractionation zone in contact with ethyl and higher fluorides and isobutane and recovering a stream of ethyl fluoride enriched HF liquid. In another of its concepts, the invention provides a process wherein ethyl fluoride is absorbed into a propane stripped, lean HF and the mixture thus obtained passed through at least a portion of the fractionation zone from which a recycle isoparaffin stream is drawn off and in which higher fluorides tend to concentrate thus to alkylate the higher fluorides and to recover an ethyl fluoride enriched HF stream. In a further concept of the invention, it provides a process wherein the alkyl fluoride enriched stream is stripped successively with isobutane and then with propane thus to recover as an overhead ethyl fluoride and the propane stripped, lean HF, earlier mentioned.

In the manufacture of alkylate using hydrogen fluoride as a catalyst, a continuing problem is removal of the small concentration of fluorides, broad range (10–50 ppm), narrow range (15–25 ppm) in the fractionated reactor product. Generally, this is accomplished by passing hot (420°F) vaporized alkylate over alumina and then condensing and cooling for storage. This costs a proportionate portion of the utilities, materials such as alumina and hydrogen fluoride, disposal costs of the aluminum fluoride, and incremental portion of processing, etc. When using ethylene in the feedstock and an ethyl fluoride modified hydrogen fluoride catalyst, the alkylate would contain approximately 2.3 weight percent fluorine, or for a 10,000 barrel per day alkylate unit, losses of about 59,400 lbs./day of HF would be expected, plus consumption of 15,000 lbs./day of alumina. To operate the plant economically, loss of fluoride to the alkylate has to be minimized.

U.S. Pat. No. 2,320,629, June 1, 1943, shows HF extraction at 18 in FIG. 1 and at 55 in FIG. 2 and describes its operations at page 2, column 2.

U.S. Pat. No. 3,209,051, Sept. 28, 1965, shows returning to the alkylation reactor a fluoride-rich sidecut taken from the fractionator 10 and describes the operation at column 2, line 26. The patent discloses that the alkyl fluorides there disclosed tend to concentrate at a point intermediate the removal of bottoms and taking off of overhead, column 1, line 35. Isopropyl fluoride is disclosed, column 3, line 12 and column 4, line 9. See also U.S. Pat. No. 3,253,054, May 24, 1966.

Ser. No. 197,835, Thomas Hutson, Jr. and Cecil O. Carter filed Nov. 11, 1971, now allowed, discloses and claims a process for recovering ethyl fluoride by extraction of the alkylation reaction effluent with hydrofluoric acid which has been treated by countercurrent contact with a predominantly isobutane stream which produces a hydrofluoric acid which can efficiently remove all of the ethyl fluoride from the reaction effluent before the reaction effluent is subjected to fractionation for recovery of isobutanes, n-butane, alkylate product, propane, ethane, and residual hydrofluoric acid. It also discloses and claims a process for the recycle of both the ethyl fluoride enriched hydrofluoric acid from the extraction of the alkylation reactor effluent and recycle of the ethyl fluoride enriched isobutane contact stream for reuse as reaction system feedstock.

Ser. No. 178,353 filed Sept. 7, 1971, Thomas Hutson, Jr. and Cecil O. Carter, now allowed, discloses and claims a process for the alkylation of an isoparaffin with ethylene and a higher olefin which comprises conducting the alkylation, separating an alkylation effluent hydrocarbon phase, subjecting said phase to fractionation in a fractionation zone to recover therefrom as an overhead a propane containing stream and as bottoms an alkylate stream, introducing into an upper portion of said zone liquid hydrogen fluoride, subjecting the rising hydrocarbon vapors containing difficultly separable ethyl-fluoride in said portion of said zone to the action of said liquid hydrogen fluoride by extractive distillation to remove from said vapors the liquid ethyl fluoride therein, removing from an intermediate portion of said fractionation zone a solution of liquid hydrogen fluoride containing dissolved therein ethyl fluoride and passing said solution to said alkylation.

Ser. No. 120,588 filed Mar. 3, 1971, Thomas Hutson, Jr. and Cecil O. Carter, now allowed, discloses and claims a process for the alkylation of an isoparaffin with ethylene and in the presence of a higher olefin promoter with a catalyst consisting essentially of hydrogen fluoride which comprises conducting said alkylation in an alkylation zone to produce an alkylation effluent, separating from said effluent an alkylate containing hydrocarbon phase and a hydrogen fluoride phase, recovering from said hydrocarbon phase an isoparaffin-containing stream also containing hydrogen fluoride, propane and alkyl fluoride including ethyl fluoride, returning a portion of said stream to said zone, passing another portion of said stream to a depropanizer zone, separating in said depropanizer zone an isoparaffin stream from a lighter stream containing HF, alkyl fluoride including ethyl fluoride and propane, passing said lighter stream to an extraction zone, subjecting said lighter stream in said extraction zone to solvent extraction with liquid HF to remove alkyl fluoride including ethyl fluoride into said liquid HF thus generating an extracted stream of propane containing HF, and an extract stream containing liquid HF and alkyl fluoride including ethyl fluoride and passing said extract stream to said alkylation zone.

U.S. Pat. No. 2,380,010, July 10, 1945, P. M. Arnold discloses alkylation in a fractionator.

The disclosures of the applications for patent and patents mentioned herein are incorporated by reference.

I have now conceived an efficient combination of steps and reactions process for the alkylation of an isoparaffin with an ethylene containing olefin alkylating feed wherein HF is used as catalyst together with ethyl fluoride wherein an HF liquid is passed into and through an alkylation effluent hydrocarbon fractionation zone into contact with isobutane, ethyl fluoride, secondary and tertiary fluorides in quantity and for a time sufficient to absorb into the HF liquid from which it can be recovered for reuse the ethyl fluoride while at the same time causing the higher fluorides to alkylate isoparaffin to generate additional alkylate. Further, I have conceived of a combination of steps for treating the ethyl fluoride enriched HF, recovered from a fractionation zone, in a combination of steps to produce a propane stripped, lean HF for use in the fractionation zone.

An object of this invention is to provide a process for the alkylation of an isoparaffin with an olefin. Another object of the invention is to provide such a process wherein the olefin contains ethylene. A still further object of the invention is to provide such a process wherein HF is used as a catalyst together with ethyl fluoride. Another object of the invention is to provide a process as described wherein there can be simultaneously recovered and alkylated, as the case may be, ethyl fluoride and higher fluorides, e.g., secondary and tertiary alkyl fluorides. It is still further an object of this invention to provide a unitary combination of steps operation wherein the foregoing objects can be accomplished.

Other aspects, concepts, objects and the several advantages of this invention are apparent from a study of this disclosure of the drawing and the appended claims.

According to the present invention there is provided a process in which in combination are effective the steps of 1. — reacting an isoparaffin with an olefin in the presence of a catalyst comprising HF to obtain a reaction effluent containing isoparaffin, normal paraffin, ethyl fluoride, higher organic fluorides, and HF, 2. — settling an acid phase and obtaining an hydrocarbon phase containing isoparaffin, paraffin, ethyl and higher organic fluorides, 3. — subjecting said hydrocarbon phase to fractionation in a fractionation zone, 4. — in said fractionation taking off overhead propane and lighter, a side-draw of isoparaffin which can be recycled to the reaction, a side-draw of n-paraffin and a bottoms alkylate containing product 5. — introducing into said fractionation zone below the overhead takeoff and above said side-draw of isoparaffin a liquid HF in an amount to absorb ethyl fluoride and to cause reaction in presence of said isoparaffin of said higher organic fluorides, 6. — passing said liquid HF in said fractionation zone downwardly to a liquid HF collecting and removal zone located below said side-draw of isoparaffin, thus absorbing ethyl fluoride and insuring alkylation of said isoparaffin with said higher organic fluorides, and 7. — removing from said fractionation zone a side-draw of ethyl fluoride enriched liquid HF.

Also according to the invention, in one embodiment, the side-draw of ethyl fluoride enriched liquid HF is passed to an HF stripping zone, in said zone the HF is stripped of ethyl fluoride, the ethyl fluoride is recovered and can be reused and there is also recovered a stripped or lean HF which also can be reused to absorb more ethyl fluoride and to further insure alkylation of the isoparaffin with the higher organic fluorides.

Still further according to the invention in said stripping zone the HF is stripped first with isoparaffin, e.g., isobutane to remove the alkyl fluoride therefrom and then the thus stripped HF, now containing some isoparaffin, is further stripped with, say, propane to remove and to recover isoparaffin, thus permitting the return to the fractionation zone of a lean HF not containing a significant amount of isoparaffin resulting from the stripping therewith.

The isoparaffin used in the process of the invention can be one of isobutane and isopentane, the olefin can be one of ethylene, propylene, butylene and hexylene. The olefin feed can comprise ethylene and a higher olefin. The ethyl fluoride can be in situ generated and/or added to the catalyst regardless of whether ethylene is a feed olefin. Usually at least some ethylene will be present in the olefin feed. Where ethylene is desired to be the preponderant olefin, there usually will be present a higher olefin in the feed, e.g., propylene.

U.S. Pat. No. 3,761,540, Sept. 25, 1973, Thomas Hutson, Jr. and Cecil O. Carter describes and claims a process for the alkylation of an isoparaffin with ethylene and the higher olefin.

Ser. No. 349,181 filed Apr. 9, 1973 by Thomas Hutson, Jr. and Cecil O. Carter describes and claims a process for alkylation of at least one isoparaffin selected from isobutane and isopentane and mixtures thereof in presence of HF catalyst, with at least one olefin selected from propylene and butylene, and employing in the alkylation reaction system ethyl fluoride as an activator or modifier for the HF catalyst.

As noted, the disclosures of patents and applications mentioned herein are incorporated by reference.

In said Ser. No. 178,353, the liquid HF acid introduced into the main fractionator is removed from above that level in the fractionator from which the recycle isoparaffin is drawn. According to the present invention, the ethyl fluoride enriched HF is an excellent catalyst in the presence of the substantial amounts of isoparaffin existing at a lower level in the fractionator to insure the alkylation of said isoparaffin with the secondary and/or tertiary fluorides, i.e., the higher organic fluorides.

The invention will now be further described and illustrated by reference to the drawing.

Referring now to the drawing, incoming fresh isobutane 1 and ethylene 2 containing feedstocks are mixed with recycle isobutane 4 and ethyl fluoride 3 from reactor effluent fractionator, then admixed in reactor riser 20 with recycled ethyl fluoride modified catalyst 25 from reactor settler 21. Reaction effluent passes to the reactor settler 21 wherein catalyst is settled and subsequently cooled and recycled. A small portion 8 is drawn off and purified to prevent buildup of water and acid soluble oils. Purified acid is returned to the process at 7. Hydrocarbon effluent 6 flows from the settler to fractionator 22. Hydrocarbon products of the reaction are removed in the order of their boiling points; propane and lighter going overhead at 19 with some hydrogen fluoride; isobutane at 4 for recycling to the reactor; normal butane at 13 and alkylate at 14. Lean (propane stripped) HF 9, is added to a tray near the top of the fractionator. HF-ethyl fluoride mixture is removed at 10. Where desired, the HF can be used for complete refluxing of fractionator 22 by utilizing the HF as a heat sink for internal reflux and reflux 34 can be eliminated.

According to the invention, the fractionator serves simultaneously to recover ethyl fluoride, and as a reactor for conversion of secondary and higher fluorides in that portion of the fractionator wherein both the isobutane concentration is high and wherein secondary and higher fluorides are found concentrating. This is the section of the fractionator 22 between the isobutane recycle 4 drawoff tray and the normal butane drawoff.

Thus according to the invention HF normally taken from the HF drawoff tray just above the recycle isobutane drawoff tray is taken from the fractionator from a locus just above the normal butane drawoff. Ethyl fluoride rich HF is passed by 10 to stripping column 26 from which ethyl fluoride 3 is recovered. It is stripped from HF with isobutane 16. The thus stripped HF is then stripped of isobutane using a limited amount of propane 15. This saves isobutane and eliminates contamination of the propane product subsequently made from the fractionator overhead. When recycle 34 is eliminated, then according to the invention the propane overhead can be more readily obtained substantially freed from isobutane. The HF is then cooled and recycled to the fractionator as fresh absorbent 9. Ethyl fluoride overhead from the stripper is condensed at 32 and recycled by 3 to the reactor feed. Overhead from the fractionator 22 is partially condensed and collected in accumulator 23. HF settled out is removed at 17 from boot 33 and recycled. Sufficient liquid 34 is returned to the fractionator 22 for reflux when desired; the balance 35 passing to hydrogen fluoride stripper 24. Propane product is removed at 12. Overhead 18 is returned to accumulator 23. Vent gases from the accumulator 23 go by 11 through ethyl fluoride and hydrogen fluoride recovery processes not shown and then are used for plant fuel.

SPECIFIC EXAMPLE

This example is calculated for a plant using an ethyl fluoride modified hydrogen fluoride catalyst to manufacture 10,000 barrels/stream day of alkylate from isobutane and mixed olefins and is to be read with the drawing. A material balance is presented in Table I.

TABLE I

MATERIAL BALANCE (BBL./DAY) FOR 10,000 BBL./DAY ALKYLATE UNIT

|  | (1) Olefin Feed | (2) Make Up Iso butane | (3) Recycle Ethyl Fluoride | (4) Recycle Iso butane | (5) Total Charge Alkylation Reactor | (6) Total Effluent From Reactor | (7) Rerun Catalyst |
|---|---|---|---|---|---|---|---|
| Methane | — | — | — | — | — | — | — |
| Ethylene | 1000 | — | — | — | 1000 | — | — |
| Ethane | 520 | — | — | — | 520 | 520 | — |
| Propane | 1081 | 69 | 70 | 5434 | 6654 | 6857 | 1.4 |
| Propylene | 2030 | — | — | — | 2030 | — | — |
| Ethyl Fluoride | — | — | 7700 | 388 | 8088 | 8088 | 7.3 |
| Iso butane | 1938 | 6513 | 3836 | 67154 | 79431 | 72918 | 22.0 |
| N-butane | 541 | 274 | 20 | 4658 | 5493 | 5493 | — |
| Iso butylene + butene 1 | 1361 | — | — | — | 1361 | — | — |
| Trans-butene 2 | 734 | — | — | — | 734 | — | — |
| Cis-butene 2 | 541 | — | — | — | 541 | — | — |
| Amylenes | 194 | — | — | — | 194 | — | — |
| Isopentane | 316 | — | 29 | — | 345 | 1404 | — |
| Alkylate | — | — | — | — | — | 9000 | — |
| HF Acid | — | — | 603 | 4086 | 4689 | 5478 | 22.7 |
| Water | — | — | 47 | 12 | 59 | 69 | 0.1 |
| ASO | — | — | 29 | 6 | 35 | 41 | — |
| Total | 10246 | 6856 | 12334 | 81738 | 111174 | 109868 | 53.5 |
| Wt. % Fluorine |  |  |  |  |  | 2.3 |  |

|  | (8) Used Catalyst | (9) HF Acid Reflux to Main Column | (10) HF Acid Draw From Main Column | (11) Vent Gas | (12) Propane Make | (13) N-butane Product | (14) Alkylate Product |
|---|---|---|---|---|---|---|---|
| Methane | — | — | — | — | — | — | — |
| Ethylene | — | — | — | — | — | — | — |
| Ethane | — | — | — | 520 | — | — | — |
| Propane | 1.4 | 13 | 83 | 238 | 1115 | — | — |
| Propylene | — | — | — | — | — | — | — |
| Ethyl Fluoride | 7.3 | 1363 | 9063 | — | — | — | — |
| Iso butane | 1.5 | 687 | 4514 | 10 | 12 | 42 | — |
| N-butane | — | 4 | 24 | — | — | 815 | — |
| Iso butylene + butene 1 | — | — | — | — | — | — | — |
| Trans-butene 2 | — | — | — | — | — | — | — |
| Cis-butene 2 | — | — | — | — | — | — | — |
| Amylenes | — | — | — | — | — | — | — |
| Isopentane | — | 5 | 34 | — | — | — | 1375 |
| Alkylate | — | — | — | — | — | — | 9000 |
| HF Acid | 22.7 | 9802 | 10405 | 144 | — | — | — |
| Water | 0.2 | 77 | 124 | 1 | — | — | — |
| ASO | 0.1 | 46 | 75 | — | — | — | — |
| Total | 33.2 | 11997 | 24322 | 913 | 1127 | 857 | 10375 |
| Wt. % Fluorine |  |  |  |  |  |  | .0016 |

The incoming fresh feedstock is mixed with recycle isobutane and recycled ethyl fluoride and fed into the riser reactor where it is mixed with recycled catalyst. Conditions at the alkylation reactor typical for production of high quality alkylate are as follows:

| Reactor Temperature | 90°F. |
|---|---|
| Reactor Residence Time | 25 sec. |
| Isobutane to Olefin Volume Ratio | 13/1 |

Alkylation catalyst composition:

| a) | Water | 0.6 wt. % |
|---|---|---|
| b) | HF Acid | 78.2 wt. % |
| c) | Acid soluble oils | 0.3 wt. % |
| d) | Ethyl fluoride | 15.1 wt. % |
| e) | Isobutane & other light hydrocarbons | 5.8 wt. % |

The reactor produces;

| | |
|---|---|
| Alkylate yield to olefin volume ratio | 1.72/1 |
| Isobutane consumed to olefin volume ratio | 1.12/1 |
| Synthetic propane yield, volume % of propylene | 10% |
| Alkylate production | 10,000 bbls./day |

The estimated product alkylate 14 quality will be:

| | |
|---|---|
| Reid vapor pressure | 3.23 psi |
| API gravity | 69.4 |
| ASTM distillation end point | 372 |
| Clear research octane | 92.1 |
| Clear motor octane | 91.4 |
| Research octane + 3 cc tetra ethyl lead | 105.3 |
| Motor Octane + 3 cc tetra ethyl lead | 106.2 |
| Alkylate range fluorides as weight percent fluoride | 0.0016 |

The catalyst in the reactor effluent is separated in the settler at approximately 110°F. and sufficient pressure to maintain liquid phase and a small portion of the catalyst (5%) sent to a rerun unit to remove acid soluble oils and water. The balance of the acid is sent through the cooler and returned to the reactor at about 90°F. The hydrocarbon settler effluent is passed to the fractionator which contains 75 trays and a drawoff tray for ethyl fluoride rich, HF absorbent. The fractionator is operated at 275 psig with a top temperature of 180°F. and a bottom temperature of 431°F. Alkylate containing eight to ten percent normal butane is withdrawn as kettle product. The fractionator serves as an HF absorber to remove ethyl fluoride and to react out secondary and higher fluorides. Conditions for reaction of secondary and higher fluorides in the fractionator are good — a very high isobutane to fluoride ratio, catalyst present and temperature satisfactory. Propane stripped, lean HF absorbent is fed to the 72nd tray of the fractionator and descends to the 45th tray from which it is removed and then processed in stripper 26 for removal of ethyl fluoride. An isobutane recycle stream is taken to the reactor from the 54th tray at 206°F. Feed is supplied to the column at the 50th tray. A side stream of n-butane is withdrawn from the 7th tray from the bottom. Light hydrocarbons, hydrogen fluoride, ethyl fluoride and propane are taken overhead and partially condensed. The condensate is settled in the accumulator, liquid hydrogen fluoride being drawn off. Sufficient liquid hydrocarbon is withdrawn for a reflux ratio (column overhead to reflux LV) of 1/1 and the remainder sent to hydrogen fluoride stripper 24, a reboiled column of 35 trays with a top temperature of 131°F. and a bottom of 147°F. operated at 315 psig from which propane is withdrawn as kettle product and the overhead recycled to the accumulator.

The ethyl fluoride rich HF absorbent is withdrawn from the 45th tray and passed to 20 tray stripper 26. A reboiled fractionator can be substituted or used together with the stripper. When a stripper is used, the 210°–216°F. feed is fed about two trays from the top and the overhead cooled to 210°F. and condensed. The bottom of the tower is maintained hot by injecting hot stripping vapors. Isobutane vapor is injected on the 4th tray at a temperature of 220°F. and 315 psig. A stripping rate of 0.4 pounds isobutane is used per pound HF. This removes all the ethyl fluoride. Superheated propane vapors are injected at the first tray to strip the isobutane from the HF so as to both reduce the loss of isobutane and prevent contamination of the propane product. A stripping rate of 0.1–0.2 pounds propane per pound of HF is used.

One skilled in the art in possession of this disclosure and having studied the same will understand that there have been set forth a combination of steps which neatly accomplish not only the removal of ethyl fluoride regardless of how it comes to be in the fractionator or depropanizer but also at the same time insure favorable conditions for causing alkylation of higher alkyl fluorides and isoparaffin within the fractionation zone thus obtaining, as described, ethyl fluoride for reuse as desired.

Reasonable variation and modification are possible within the scope of the foregoing disclosure, drawing, and the appended claims to the invention the essence of which is that there are accomplished within the usual fractionation or depropanizer fractionation zone of an isoparaffinolefin alkylation hydrocarbon effluent the removal of ethyl fluoride and of the alkylation of isoparaffin by higher alkyl fluorides by introducing into said fractionation zone below the overhead takeoff liquid HF and passing said liquid HF downwardly through said zone through at least a portion thereof in which there is present sufficient isoparaffin to cause alkylation of said isoparaffin by higher alkyl fluorides also concentrating in said zone.

I claim:

1. In the alkylation of an isoparaffin with an olefin which comprises reacting an isoparaffin with an olefin in the presence of an acid catalyst comprising HF to obtain a reaction effluent containing isoparaffin, normal paraffin, propane, ethyl fluoride and higher organic fluorides with settling of the acid phase and obtaining a hydrocarbon phase containing isoparaffin, normal paraffin, propane, ethyl fluoride and said higher fluorides with subsequent passage of said hydrocarbon phase to fractionation in a fractionation zone, the method of recovering ethyl fluroide into HF and simultaneously alkylating higher organic fluorides comprising: (1) in said fractionation zone taking off overhead propane and lighter hydrocarbons, (2) separating isoparaffin as a side-draw stream from said fractionation zone and recycling said isoparaffin stream to the alkylation reaction zone, (3) separating said normal paraffin as a side-draw stream from the lower portion of said fractionation zone, (4) separating a bottoms alkylate product, (5) introducing into said fractionation zone below said overhead and above said side-draw stream of isoparaffin of step 2 a liquid HF in an amount to absorb ethyl fluoride and to cause reaction in the presence of said isoparaffin of said higher fluorides, (6) passing said liquid HF in said fractionation zone downwardly to a liquid HF-collecting-and-removal zone, said zone being located below said side-draw of isoparaffin of step 2 so that ethyl fluoride is absorbed and said isoparaffin is alkylated with said higher fluorides, and (7) separating from said HF-collecting-and-removal zone a side-draw stream of enriched liquid HF containing ethyl fluoride.

2. A method according to claim 1 wherein said side-draw stream of enriched HF containing ethyl fluoride is stripped of ethyl fluoride and the liquid HF is returned for reuse in said fractionation zone.

3. A method of claim 2 wherein said enriched HF containing ethyl fluoride is first stripped with isoparaffin to remove ethyl fluoride and then said denuded HF is stripped with a normal paraffin to remove isoparaffin.

4. A method of claim 1 wherein said normal paraffin used in stripping the denuded HF is propane.

* * * * *

UNITED STATES PATENT AND TRADEMARK OFFICE
CERTIFICATE OF CORRECTION

PATENT NO. : 3,920,767
DATED : November 18, 1975
INVENTOR(S) : Cecil O. Carter

It is certified that error appears in the above-identified patent and that said Letters Patent are hereby corrected as shown below:

In the title, "Ethyl Fluorine" should be "Ethyl Fluoride.

Column 8, line 68, "1" should be "3".

Signed and Sealed this ninth Day of March 1976

[SEAL]

Attest:

RUTH C. MASON
*Attesting Officer*

C. MARSHALL DANN
*Commissioner of Patents and Trademarks*